United States Patent

Murray et al.

[15] 3,665,436

[45] May 23, 1972

[54] LONG-WEARING MAGNETIC HEAD

[72] Inventors: Joseph John Murray, Nesconset; Charles B. Pear, Jr., Greenlawn, both of N.Y.

[73] Assignee: Potter Instrument Company Inc., Plainview, N.Y.

[22] Filed: June 17, 1970

[21] Appl. No.: 47,007

[52] U.S. Cl...............340/174.1 F, 179/100.2 C, 346/74 MC

[51] Int. Cl.........................................G11b 5/22, G11b 5/40

[58] Field of Search .....................179/100.2 C; 340/174.1 F; 346/74 MC

[56] References Cited

UNITED STATES PATENTS

| | | | |
|---|---|---|---|
| 3,432,839 | 3/1969 | Stapper | 179/100.2 C |
| 3,479,737 | 11/1969 | Hinlein | 179/100.2 C |
| 3,249,700 | 5/1966 | Duinker et al. | 179/100.2 C |
| 3,417,386 | 12/1968 | Schneider | 346/74 MC |

FOREIGN PATENTS OR APPLICATIONS

| | | | |
|---|---|---|---|
| 776,348 | 6/1957 | Great Britain | 346/74 MC |

*Primary Examiner*—Bernard Konick
*Assistant Examiner*—J. Russell Goudeau
*Attorney*—Laurence J. Marhoefer

[57] ABSTRACT

The specification and drawings disclose a long-wearing, multiple-track magnetic head in which a ceramic coating tapers to a feather edge that resists spalling and galling on each side of the transducer gap line.

2 Claims, 5 Drawing Figures

INVENTORS
J. JOHN MURRAY
CHARLES B. PEAR, JR.
BY Laurence J. Marhoefer
ATTORNEY

LONG-WEARING MAGNETIC HEAD

BACKGROUND OF THE INVENTION

This invention relates to a magnetic head for recording and reading magnetic tapes which are in contact with the head and, more particularly, to an improved long-wearing head.

A multiple-track recording on magnetically coated tape is widely used to store information for digital computing systems. Apparatus known as a magnetic tape transport moves the tape over a transducing head which records information on or reads information from the tape. Advantageously, each head has two sets of transducers, one for recording and one for reading information. The tape is essentially in contact with the head in the region of the transducing gaps. Actually the tape tends to fly off the head very slightly at high tape speeds but strikes it often enough to produce the wear. At high tape speeds the head wears relatively rapidly until the individual transducers of the head become worn in the region of the transducing gaps, degrading the head output signal initially and making it unusable ultimately.

One prior art proposal for a long-wearing head has been to make the tips of the transducing pole pieces themselves of a hard, long-wearing material such as Alfesil. Another proposal is to coat the region on either side of the transducer gap with a hard metal such as chromium applied by spraying or electroplating or the like. Alternatively, it has been proposed to bond inserts of tungsten carbide or other suitable wear-resistant inserts to the head on either side of the transducer gap. While potentially attractive, such proposals have not proved satisfactory. It is quite difficult to fabricate small pole pieces from hard, long-wearing material with suitable magnetic properties. Metallic coatings are not sufficiently wear resistant. Hard, nonmetallic materials proposed in the prior art, such as tungsten carbide, tend to spall at the edges.

The object of this invention is the provision of a dual-gap, magnetic head which has a long operating life, good operating characteristics, and low cost.

SUMMARY OF THE INVENTION

Briefly, this invention contemplates the provision of a dual-gap, magnetic head which has a hard, long-wearing ceramic coating on both sides of each set of transducing gaps. The region between the sets of gaps is coated, but the gaps, themselves, and a small region on either side thereof are uncoated. The ceramic coating is applied by directing small, molten particles of the coating material at high velocity onto the surface of the head. This coating fills regions of the head on either side of each gap which had been cut away forming slopes along which the coating feathers into the head.

DESCRIPTION OF THE DRAWINGS

Having briefly described this invention, it will be described in greater detail along with other objects and advantages in the following detailed description of a preferred embodiment which may be best understood by reference to the accompanying drawings. These drawings form part of the instant specification and are to be read in conjunction therewith. Like reference numerals are used to indicate like parts in the various views.

DESCRIPTION OF THE PREFERRED EMBODIMENTS

Figure 1:
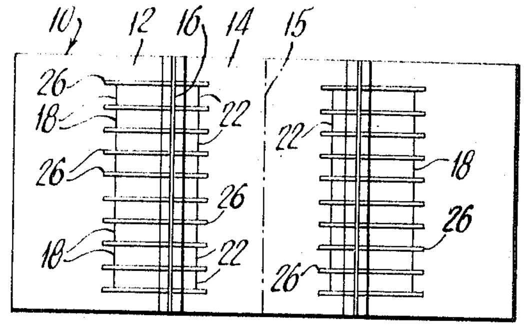
FIG. 1 is a top view of an assembled magnetic head.
Figure 2:
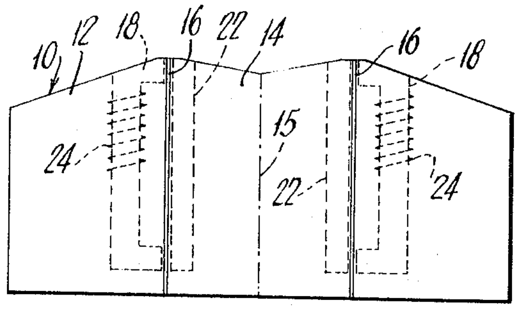
FIG. 2 is a side elevation of the head shown in FIG. 1.

FIGS. 1 and 2 of the drawing show a dual-gap, nine-channel (nine-transducer) head typical of those commonly used in the computer industry. It will be understood that this head is generally symmetrical about a center line 15 and, for this reason, only the left-hand half of the head will be described in detail. Of course, this invention may be practiced with heads having any desired number of channels.

The head, generally indicated by the reference numeral 10, has two blocks 12 and 14 of brass or other suitable nonmagnetic material joined together by bolts (not shown), for example. Generally "C" shaped pole pieces 18 are bonded in place in the block 12 and generally "I" shaped pole pieces 22 are bonded in the block 14. Epoxy is a suitable bonding material. A nonmagnetic spacer 16 separates the blocks 12 and 14 and forms a transducing gap between the pole pieces 18 and 22. It should be noted that the "C" shaped cores 18 carry a magnetic winding 24 and the "I" shaped core halves 22 complete the magnetic path. A spacer and magnetic shield 26 is disposed between each of the pole pieces 18 and 22 in order to mechanically separate and magnetically isolate the transducers. The head thus far described is typical of those known in the prior art and is included here to facilitate an understanding of this invention.

Figure 3:
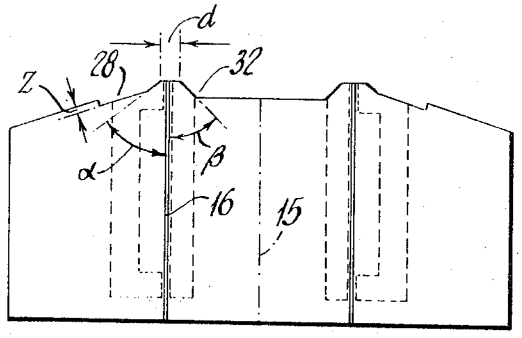
FIG. 3 is a side elevation similar to FIG. 2 showing the head with regions cut away on either side of the gap line.

Referring now to FIG. 3, the next step in manufacturing a head is to remove a region 28 of the block 12 and the cores 18 extending from a line closely adjacent the gap 16. Similarly, a region 32 on the other side of the gap 16 is removed leaving a small plateau in the region of the gap 16. The slope of the cut adjacent the gap should be such that angles $\alpha$ and $\beta$ of FIG. 3 are in a range between 15° and 60° so that the coating feathers into the head block and does not spall or peel at these critical edges. It should be noted also that the width $d$ of the narrow plateau must be such that the tape as it passes over the gap does not pound the plateau down so that eventually the contact between the tape and the gap 16 is unreliable. A plateau width $d$ in a range between 0.01 inch and 0.07 inch is satisfactory.

After regions 28 and 32 have been formed in the block, the entire upper surface of the block is coated with a ceramic coating material that resists spalling and galling. Chromium oxide is a preferred material; aluminum oxide and an aluminum oxide/titanium oxide combination are also satisfactory. Chromium oxide may be applied advantageously by a plasma-plating. Briefly, in a plasma plating process known in the art, a torch maintains a high-velocity inert gas jet at about 30,000° F. The jet is produced by an internal electric arc and no combustion takes place. The chromium oxide is introduced into the plasma in powder form, where the particles are melted and accelerated onto the head being coated at supersonic velocity. As these particles strike the head, a high density layer is formed upon impact producing a microscopic weld so that for practical purposes the coating actually becomes part of the head.

Figure 4:
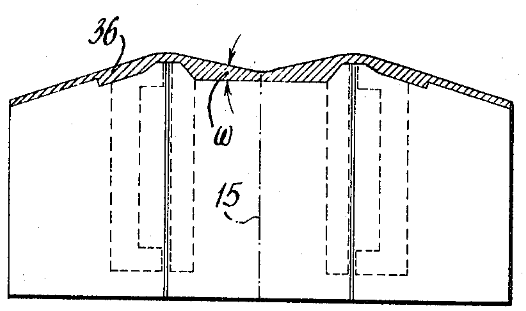
FIG. 4 is a side elevation of the head shown in FIG. 3 after its entire upper surface has been coated.
Figure 5:
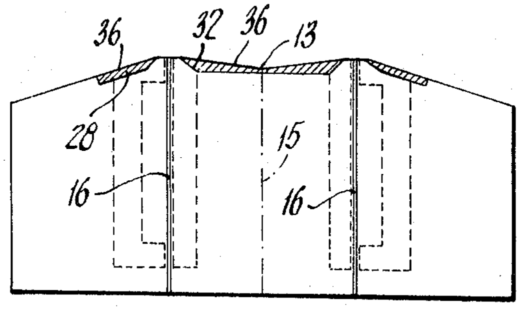
FIG. 5 is a side elevation of a head in accordance with this invention.

FIG. 4 shows the head 10 in the intermediate state with a coating 36 of chromium oxide (or other suitable material) covering the entire upper surface of the head. This coating is ground; first completely exposing the gap 16 and the plateau on either side of this gap line. The exposed plateau is used as a reference surface for grinding the coating material 36 which fills the regions 28 and 32. As shown in FIG. 5, this material is ground and then lapped until the surface of the head has a desired contour; usually about the same contour as the original head shown in FIGS. 1 and 2. It should be noted that coating material 36 extends completely between the two gaps.

Thus it will be appreciated that the objects of the invention have been accomplished. The coated head of this invention is relatively easy to construct and provides long-wearing operation without degradation of its electrical performance characteristics.

What is claimed is:

1. A wear-resistant magnetic head comprising in combination:

a block;

a plurality of magnetic transducers in said block;

each of said transducers having a transducing gap;

said block supporting said plurality of transducers with their respective gaps aligned and with each transducer in the region adjacent its respective gap substantially flush with one surface of said block;

a ceramic material coating said block, said coating material being applied by impinging said block with high-velocity molten particles of said coating material, said coating extending from an edge along each side of said gaps away from said gaps defining a plateau between said edges free of said coating, said plateau having a width in a range between 0.01 inch and 0.07 inch inclusive with said transducing gaps centrally disposed on said plateau;

said block sloping towards each of said edges at an angle in a range between 15° and 60° with respect to a plane perpendicular to the plane of said plateau, whereby said coating feathers into said block at each of said edges.

2. A long-wearing magnetic head as in claim 1 wherein said coating material is aluminum oxide.

* * * * *